United States Patent [19]

Iwanaga et al.

[11] 4,194,518
[45] Mar. 25, 1980

[54] GOVERNOR HAVING ABILITY OF REMOVING DUST FROM WORKING FLUID IN AUTOMATIC TRANSMISSION

[75] Inventors: Kazuyoshi Iwanaga, Yokohama; Kazuhiko Sugano, Tokyo; Kunio Ohtsuka, Yokohama; Takahiro Yamamori, Tokyo, all of Japan

[73] Assignee: Nissan Motor Company, Limited, Japan

[21] Appl. No.: 26,580

[22] Filed: Apr. 3, 1979

Related U.S. Application Data

[63] Continuation-in-part of Ser. No. 947,127, Sep. 29, 1978, abandoned.

[30] Foreign Application Priority Data

Sep. 13, 1978 [JP] Japan ................................. 53-112644

[51] Int. Cl.² ............................................. G05D 13/08
[52] U.S. Cl. ........................................ 137/15; 137/54; 137/56; 137/546

[58] Field of Search ................. 137/15, 546, 47, 48, 137/54, 56

[56] References Cited

U.S. PATENT DOCUMENTS

| | | | |
|---|---|---|---|
| 1,592,191 | 7/1926 | Etzelt | 137/546 X |
| 3,048,184 | 8/1962 | Duffy | 137/54 X |

*Primary Examiner*—Robert G. Nilson
*Attorney, Agent, or Firm*—Thompson, Birch, Gauthier & Samuels

[57] ABSTRACT

A governor is disclosed in which dust which may comprise steel powder, fine particles of sand and so on will be removed from a hydraulic working fluid by subjecting the working fluid to centrifugal force. A fluid passage for the working fluid is formed in a housing of the governor and a chamber communicates with the passage at the opening. The fluid passage has an opening located such that dust contained in working fluid will enter into the chamber through the opening while the housing is rotating. Within the chamber working fluid will be stagnant and dust sedimented.

6 Claims, 8 Drawing Figures

LINE PRESSURE — GOVERNOR PRESSURE

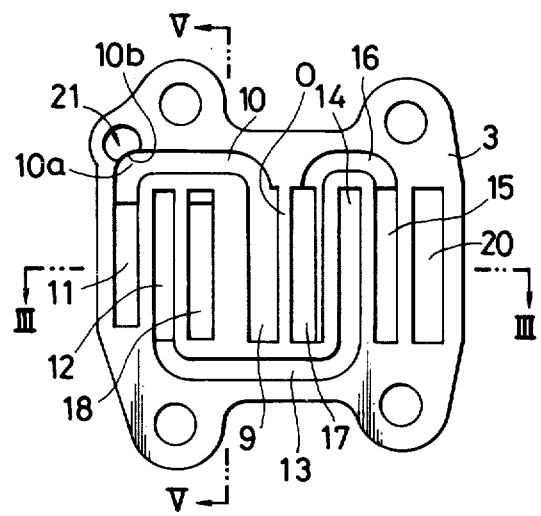
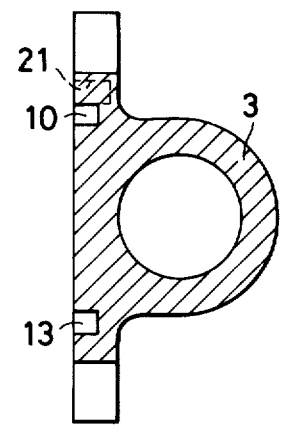
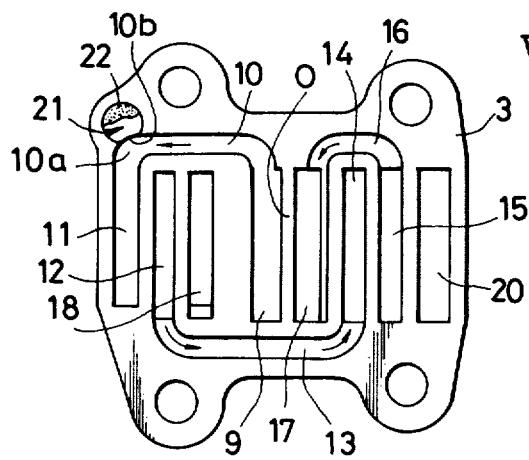
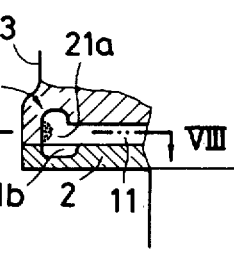
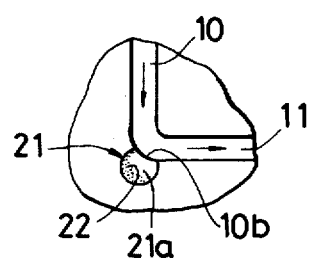

GOVERNOR HAVING ABILITY OF REMOVING DUST FROM WORKING FLUID IN AUTOMATIC TRANSMISSION

RELATED APPLICATION

This application is a continuation-in-part-application of applicant's pending U.S. patent application Ser. No. 947,127, filed on Sept. 29, 1978, now abandoned.

BACKGROUND OF THE INVENTION

This invention relates to a governor, and more particularly to a governor which is capable of removing dust from working fluid passing therethrough.

An automatic transmission for automobiles consists fundamentally of a torque converter, a transmission assembly and a hydraulic control system. If a hydraulic working fluid circulating through the hydraulic control system contains an appreciable quantity of dust which may comprise steel powder, fine particles of sand and so on, there is a strong possibility of the hydraulic control system functioning inaccurately and, as the most significant problem, various hydraulic control valves in the control system are liable to exhibit malfunction or to become inoperative by reason of sticking.

Every automatic transmission, therefore, uses an oil strainer to remove dust from the working fluid. However, it is practically impossible to trap a very fine portion of the dust by means of an oil strainer (or oil strainers) since there is a limitation to the mesh size of wire screen in the strainer. If the mesh size is made extremely small so that even very fine dust particles may be trapped, the meshes will be clogged in short time during use of the strainer with the result that the working fluid does not smoothly circulate through the hydraulic control system.

SUMMARY OF THE INVENTION

It is an object of the present invention to provide a highly effective and practicable method and apparatus for the removal of dust, even very fine dust, from hydraulic fluid in an automotive automatic transmission.

According to the invention, centrifugal force produced during operation of a governor is utilized for collecting dust from hydraulic working fluid.

It is another object of the invention to add a governor another function of removing dust from hydraulic working fluid with little modification of the governor.

According to the invention, a fluid passage in a governor has an opening and a chamber communicates with the fluid passage at the opening. This opening is located such that dust contained in hydraulic working fluid in the fluid passage will enter into the chamber through the opening while the governor is rotating.

BRIEF DESCRIPTION OF THE DRAWINGS

FIG. 4 is a bottom plan view of the governor case of FIG. 3;

FIG. 5 is a sectional view taken along the line V—V of FIG. 4;

FIG. 6 is the same bottom plan view as FIG. 4 presented for explanation of the effect of the present invention;

FIG. 7 is a sectional view taken along the line IV—IV of FIG. 2; and

FIG. 8 is a sectional view taken along the line VIII—VIII of FIG. 7.

DESCRIPTION OF THE PREFERRED EMBODIMENTS

Figure 1:
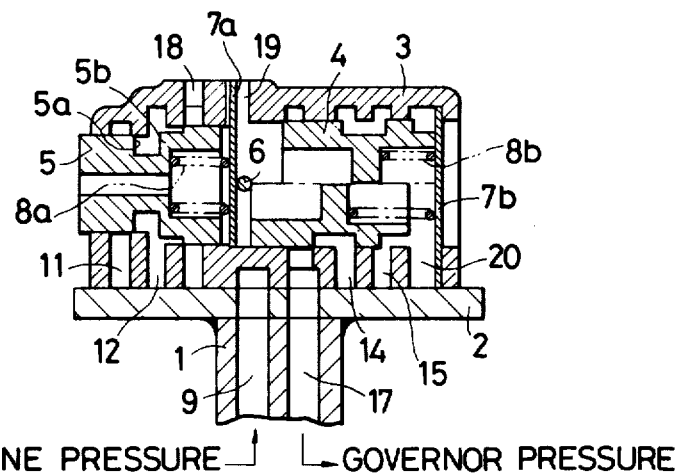
FIG. 1 is a longitudinal sectional view of a governor according to the invention taken along the line I—I of FIG. 2.
Figure 2:
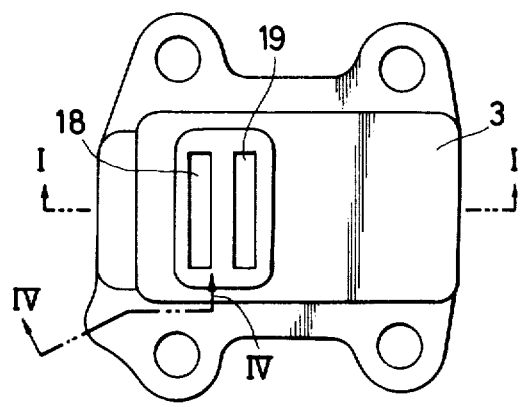
FIG. 2 is a top plan view of a governor shown in FIG. 1.
Figure 3:
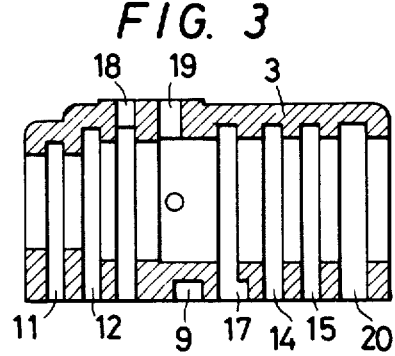
FIG. 3 is a sectional view of a governor case for the governor taken along the line III—III of FIG. 4.

A governor according to the invention does not essentially differ from conventional governors for use in automatic transmissions. FIG. 1 shows, by way of example, a governor in which the invention is embodied. This governor comprises a primary governor valve 4 and a secondary governor valve 5 disposed in the usual manner in a housing made up of a base plate 2 and a governor valve body or case 3. Fixed perpendicularly to the base plate 2 is a governor shaft 1 which is driven by an output shaft (not shown) of an automatic transmission to rotate at a rate proportional to the vehicle speed. Using a retainer plate 7a held in position by a stopper pin 6, a spring 8a is installed so as to bias the secondary governor valve 5 in the direction of a centrifugal force which is produced by rotation of the housing with the shaft 1 as the axis of rotation. With the provision of another retainer plate 7b, a spring 8b is installed so as to bias the primary governor valve 4 towards the center axis of the governor unit, i.e. in the direction opposite to the aforementioned centrifugal force. Referring also to FIGS. 2-5, a series of fluid passages 9-10-11 are formed in the housing to admit line pressure of the hydraulic control system of an automatic transmission and another series of fluid passages 12-13-14-15-16-17 to deliver governor pressure. These fluid passages may be formed by drilling and/or grooving the shaft 1, base plate 2 and case 3 and/or moulding. Indicated at 18, 19 and 20 are drain ports for these fluid passages.

While the vehicle is at a stop, the governor shaft 1 makes no rotation and hence no centrifugal force acts on the governor valves 4 and 5. In this state the spring 8a causes the secondary governor valve 6 to move from the position illustrated in FIG. 1 to the outside, allowing the oil passage 11 to communicate with the passage 12. Then both a minor land 5a and a major land 5b of the secondary governor valve 5 are exposed to the line pressure admitted through the passages 9-10-11. Due to a difference between the annular areas of the major and minor lands 5b and 5a, the secondary governor valve 5 is moved to the inside by the line pressure against the force of the spring 8a. When the secondary valve 5 moves to a certain extent (to the position of FIG. 1) the oil passage 12 becomes blocked from the passage 11 and, instead, comes into communication with the drain port 18 through a narrow gap, resulting in lowering of fluid pressure in the passage 12.

While no centrifugal force acts on the primary governor valve 4, the spring 8b causes this valve 4 to take an inner position (FIG. 1 shows a lower half of the primary valve 4 in this position) so as to block the oil passage 15 from the passage 14. In this state, a governor pressure which balances with the force of the spring 8a for the secondary valve 5 appears in the oil passages 12, 13 and 14, but this governor pressure is not delivered from the governor unit since the primary valve 4 prevents the oil passage 15 from communicating with the passage 14.

When the vehicle is started and as the centrifugal force acting on the secondary governor valve 5 increases, this valve 5 moves gradually and slightly to the outside, resulting in that the oil passage 12 communicates with the passage 11 through a gap which enlarges as the centrifugal force increases, whereas the gap between the passage 12 and the drain port 18 diminishes. Accordingly there occurs a gradual rise in the governor pressure in the passage 12 until a balance is established between the governor pressure and the sum of the centrifugal force acting on the valve 5 and the force of the spring 8a. Thus the governor pressure changes in compliance with changes of the vehicle speed.

When the vehicle speed exceeds a predetermined level, the centrifugal force acting on the primary governor valve 4 overcomes the force of the spring 8b with the result that the valve 4 moves to the outside to take an outer position (FIG. 1 shows an upper half of the primary valve 4 in the upper position), whereby the oil passage 15 is allowed to communicate with the passage 14. Then the governor pressure produced in the oil passage 12 is delivered from the governor unit through the oil passages 12-13-14-15-16-17.

During lowering of the vehicle speed, the governor valves 4 and 5 act reversely to the above description so as to lower the governor pressure as the vehicle speed lowers until interruption of the delivery of the governor pressure at the predetermined vehicle speed. Thus the governor unit provides a governor pressure, which increases and decreases as the vehicle speed rises and lowers, to external fluid circuits so long as the vehicle speed is above a predetermined level.

Referring to FIG. 4, the fluid passage 10 continues in series to the fluid passage 11, so that these two passages 10, 11 can be regarded as a single fluid passage. There is a turn portion 10a in this fluid passage 10-11 at the junction of the upstream and downstream passages 10 and 11 since these passages 10 and 11 extend in different directions. According to the invention, this fluid passage 10-11 has an opening 10b and a chamber 21 is formed in the housing. This chamber 21 communicates with the passage 10-11 at the opening 10b. The opening 10b is located such that dust contained in working fluid in the passage 10-11 will enter into the chamber 21 through the opening 10b while the housing is rotating. In this embodiment, the opening 10b communicates with the turn portion 10a so that flow of working fluid within the upstream passage 10 is directed toward the opening 10b. The chamber 21 is shaped and sized such that working fluid will be stagnant therein.

Referring to FIG. 6, the working fluid flows through the fluid passages in the governor as indicated by arrows. During rotation of the governor, the centrifugal force causes dust contained in the flowing working fluid to migrate into outer regions (with respect to the axis O of rotation ) of the respective fluid passages. Accordingly, the dust readily enters the chamber 21 as indicated by reference numeral 22 and accumulates therein while the working fluid passes through the turn portion 10a of the passage 10-11. The dust 22 accumulated in the chamber 21 can be taken out when the governor case 3 is detached from the base plate 2. The chamber 21 is formed with an adequately large volume so that governor may retain the dust-collecting ability for a sufficiently long period of time without the need of disassembling the governor housing at short intervals.

It will be understood that the location of the chamber 21 in FIG. 4 is exemplary. The chamber 21 may be formed at any location of the fluid passages in the governor housing on condition that during rotation of the housing of the governor a centrifugal force acts on the fluid flowing alongside the chamber 21. However, it is preferable that the distance of the bulge 21 from the axis O of rotation is made as long as possible. Furthermore, it is most preferable to form the chamber 21 in the passages 9-10-11 for admission of line pressure at a section upstream of the secondary governor valve 5 from the viewpoint of precluding sticking of either of the two governor valves 4 and 5. If desired, dust-collection chambers 21 may be formed at two or more locations of the fluid passages in the governor. In an automatic transmission, a conventional oil strainer may be utilized in combination with a governor according to the invention so that a relatively coarse portion of the dust may be removed from the working fluid in the strainer.

As a primary advantage of dust collection by forming the chamber 21 in the fluid passage and by utilizing the centrifugal force, the collection is effective to even extremely fine dust particles which cannot be removed from fluid by ordinary oil strainers. Accordingly, the working fluid leaves a governor according to the invention in an exceedingly clean state, i.e. in a state almost free of dust. In an automatic transmission, the use of a governor according to the invention brings about prolongation of service life of hydraulic control valves in the transmission without need of any modification of the construction of the hydraulic control system.

As will be readily understood from FIGS. 5–8, the chamber 21 includes a first portion 21a extending radially outwardly of the opening 10b with respect to the axis of rotation of the housing of the governor. The first portion 21a of the chamber is adapted to receive dust contained in working fluid flow through the passage 10-11 while the housing is rotating.

Preferably, the governor shaft 1 is arranged generally vertically when installing the governor.

The chamber 21 includes in addition to the first portion 21a a second portion 21b adapted to receive dust which may drop from the first portion 21a when the housing is at a rest. The provision of the second portion 21b will reduce the possibility that the dust may reenter the passage 10-11.

Referring to the size of the opening 106, it is chosen such that flow of working fluid through the passage 10-11 may not be affected by the provision of this opening so as to assure stagnation of working fluid within the chamber 21.

What is claimed is:

1. A governor comprising:
    a housing rotatable about an axis;
    a fluid pressure passage formed in said housing;
    said fluid pressure passage having an opening;
    a chamber formed in said housing and communicating with said fluid pressure passage at said opening;
    said opening being located such that dust contained in working fluid through said fluid pressure passage will enter into said chamber through said opening while said housing is rotating; and
    said chamber being shaped and sized such that working fluid will be stagnant therein.

2. A governor as claimed in claim 1, in which
    said chamber includes a first portion extending radially outwardly of said opening with respect to the axis of rotation of said housing, and
    said chamber includes a second portion adapted to receive dust dropping from said first portion.

3. A governor as claimed in claim 1 or 2, in which the size of said opening is chosen such that flow of working fluid through said fluid pressure passage may not be affected by the provision of said opening so as to assure stagnation of working fluid within said chamber.

4. A governor as claimed in claim 3, in which said fluid passage includes an upstream passage portion, a downstream passage portion and a turn portion where working fluid coming from said upstream passage portion makes a turn to go into said downstream passage portion; and said opening communicates with said turn portion so that flow of working fluid within said upstream passage portion is directed toward said opening.

5. A governor as claimed in claim 4, in which said fluid passage communicates with a centrifugal pressure responsive valve at an inlet port of the latter.

6. The method of removing dust contained in a working fluid circulating through a hydraulic control system of an automotive automatic transmission, comprising the step of using a governor by forming within a rotatable housing thereof a chamber which communicates with a fluid pressure passage for the working fluid so as to collect dust contained in the working fluid.

* * * * *